(12) United States Patent
Liu et al.

(10) Patent No.: US 8,498,066 B2
(45) Date of Patent: Jul. 30, 2013

(54) PROJECTION LENS SYSTEM WITH LONG BACK FOCAL LENGTH

(75) Inventors: Xiao-Na Liu, Guangdong (CN); Hai-Jo Huang, New Taipei (TW); Fang-Ying Peng, New Taipei (TW); An-Tze Lee, New Taipei (TW); Sheng-An Wang, New Taipei (TW)

(73) Assignees: Premier Image Technology (China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,685

(22) Filed: Dec. 30, 2011

(65) Prior Publication Data
US 2013/0141804 A1 Jun. 6, 2013

(30) Foreign Application Priority Data
Dec. 6, 2011 (CN) .......................... 2011 1 0400603

(51) Int. Cl.
*G02B 9/04* (2006.01)

(52) U.S. Cl.
USPC .......................................... 359/793; 359/717

(58) Field of Classification Search
USPC .................. 359/753, 793, 749–752, 754–756, 359/761, 763, 770, 771, 781, 784, 717
See application file for complete search history.

(56) References Cited

U.S. PATENT DOCUMENTS
2009/0052055 A1* 2/2009 Lin .............................. 359/717

* cited by examiner

*Primary Examiner* — Darryl J Collins
*Assistant Examiner* — Gary O'Neill
(74) *Attorney, Agent, or Firm* — Altis Law Group, Inc.

(57) ABSTRACT

A projection lens system, in the order from a magnified side to a reduced side, includes a first lens group with negative refraction power and a second lens group with positive refraction power. The projection lens system satisfies the formulas: $-1.55 < F1/F2 < -1.12$; wherein F1 is the effective focal length of the first lens group, and F2 is the effective focal length of the second lens group.

8 Claims, 14 Drawing Sheets

PROJECTION LENS SYSTEM WITH LONG BACK FOCAL LENGTH

BACKGROUND

1. Technical Field

The present disclosure relates to projection lens systems and, particularly, to a projection lens systems with a long back focal length.

2. Description of Related Art

Projection lens systems generally include at least two lens groups for focusing light rays reflected from a digital mirror device (DMD) on a screen. One of the at least two lens groups moves in relative to the other lens group to adjust a focal length of the projection lens system. However, when the projection lens system is designed with a lower aberration, a back focal length of the projection lens system is very short. Therefore, there is not enough room for positioning optical elements, such as DMD, in the range of the back focal length.

Therefore, it is desirable to provide a projection lens system which can overcome the limitations described above.

DETAILED DESCRIPTION

Embodiments of the disclosure will now be described in detail with reference to the accompanying drawings.

Figure 1:
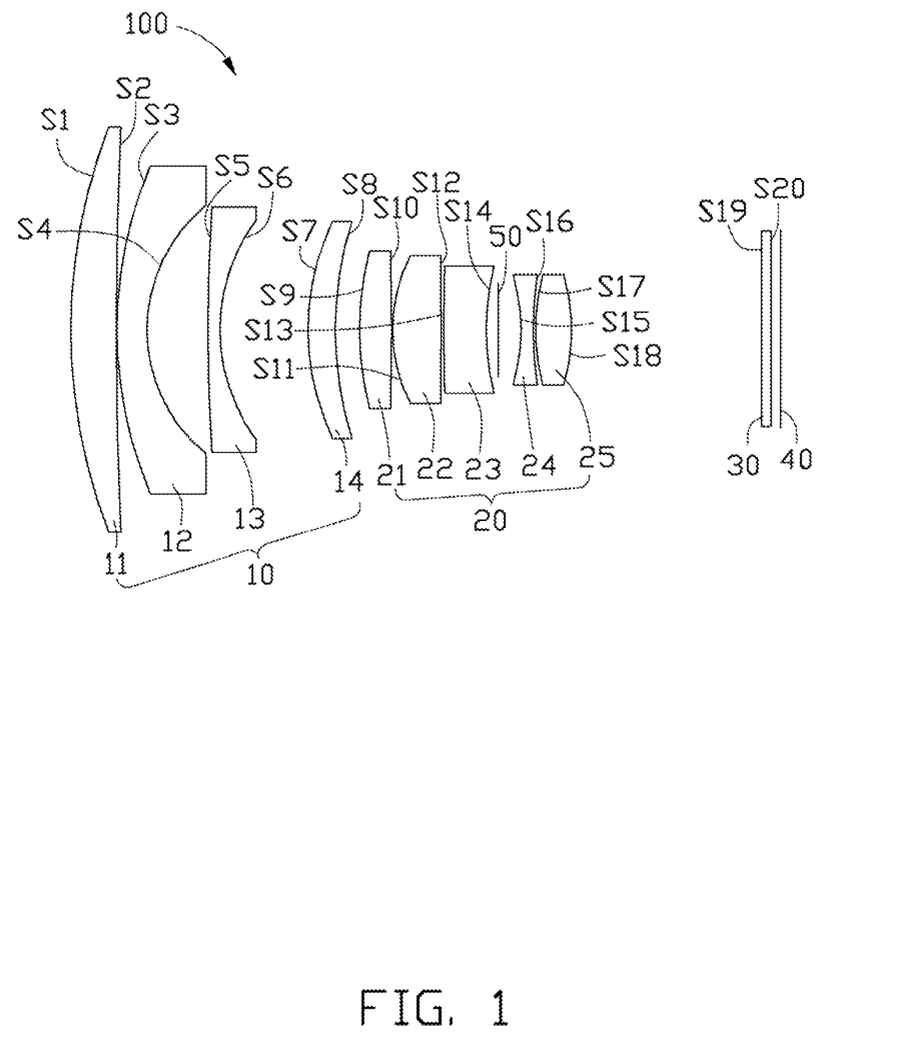
FIG. 1 is a schematic view of a projection lens system in accordance with a first exemplary embodiment.

Referring to FIG. 1, a projection lens system 100, according to a first exemplary embodiment, projects an image onto a screen (not shown). The projection lens system 100 includes, in the order from a magnified side to a reduced side, a first lens group 10 with negative refraction power, a second lens group 20 with positive refraction power, and a filter glass 30. During focusing, the first lens group 10 and the second lens group 20 move along an optical axis of the projection lens system 100. The projection lens system 100 can be set among a wide-angle state and a telephoto state.

In this embodiment, the projection lens system 100 is utilized in a digital light processing (DLP) projector. A spatial light modulator (SLM) 40, for example, a digital micro-mirror device (DMD), modulates light rays for projecting through the projection lens system 100. The light rays transmit through the filter glass 30, the second lens group 20, and the first lens group 10 in order, and then project onto the screen.

The first lens group 10 includes, in the order from a magnified side to a reduced side of the projection lens system 100, a first lens 11 with positive refraction power, a second lens 12 with negative refraction power, a third lens 13 with negative refraction power, and a fourth lens 14 with positive refraction power. The first lens 11, the second lens 12, the third lens 13, and the fourth lens 14 are spherical lenses. The first lens 11 is meniscus shaped and includes a convex first surface S1 facing the magnified side, and a concave second surface S2 facing the reduced side. The second lens 12 is meniscus shaped and includes a convex third surface S3 facing the magnified side, and a concave fourth surface S4 facing the reduced side. The third lens 13 is meniscus shaped and includes a convex fifth surface S5 facing the magnified side, and a concave sixth surface S6 facing the reduced side. The fourth lens 14 is meniscus shaped and includes a convex seventh surface S7 facing the magnified side, and a concave eighth surface S8 facing the reduced side.

The second lens group 20 includes, in the order from a magnified side to a reduced side of the projection lens system 100, a fifth lens 21 with positive refraction power, a sixth lens 22 with positive refraction power, a seventh lens 23 with negative refraction power, an eighth lens 24 with negative refraction power, and a ninth lens 25 with positive refraction power. The fifth lens 21, the sixth lens 22, the seventh lens 23, and the eighth lens 24 are spherical lenses. The ninth lens 25 is aspherical lens. The fifth lens 21 is biconvex shaped and includes a convex ninth surface S9 facing the magnified side, and a convex tenth surface S10 facing the reduced side. The sixth lens 22 is biconvex shaped and includes a convex eleventh surface S11 facing the magnified side, and a convex twelfth surface S12 facing the reduced side. The seventh lens 23 is meniscus shaped and includes a convex thirteenth surface S13 facing the magnified side, and a concave fourteenth surface S14 facing the reduced side. The eighth lens 24 is biconcave shaped and includes a concave fifteenth surface S15 facing the magnified side, and a concave sixteenth surface S16 facing the reduced side. The ninth lens 25 is biconvex shaped and includes a convex seventeenth surface S17 facing the magnified side, and a convex eighteenth surface S18 facing the reduced side.

The filter glass 30 is flat plate shaped, and includes a nineteenth surface facing the magnified side and a twentieth surface facing the reduced side.

The aperture stop 50 is positioned between the seventh lens 23 and the eighth lens 24. The aperture stop 50 adjusts the light flux from the seventh lens 23 to the eighth lens 24. In addition, the aperture stop 50 facilitates a uniform light transmission when light passes through the seventh lens 23, to correct chromatic aberrations of the lens system 100.

In this embodiment, in order to reduce the number of the lenses of the projection lens system 100, the ninth lens 25 is a moulded lens and made of glass. In order to decrease the size of the projection lens system 100, the projection lens system 100 consists of at most ten lenses.

The projection lens system 100 satisfies the formula:

$$-1.55 < F1/F2 < -1.12; \qquad (1)$$

wherein F1 is the effective focal length of the first lens group 10, and F2 is the effective focal length of the second lens group 20. Formula (1) is for lengthening a back focal length BFL of the projection lens system 100 in a condition of the projection lens system 100 obtains a high image quality.

The projection lens system 100 further satisfies the formula:

$$0.2 < BFL/L < 0.28; \qquad (2)$$

wherein BFL is the distance from the second lens group 20 to the SLM 40, and L is a total length of the projection lens system 100. Formula (2) is for decreasing the size and correcting the aberration of the projection lens system 100 in a condition of the projection lens system 100 obtains a longer back focal length BFL.

The above aspherical surfaces are shaped according to the formula:

$$x = \frac{ch^2}{1 + \sqrt{1 - (k+1)c^2h^2}} + \sum A_i h^i$$

wherein h is a height from the optical axis of the sixth lens 31 to the aspherical surface, c is a vertex curvature, k is a conic constant, and Ai are i-th order correction coefficients of the aspherical surfaces.

The following symbols are used:

R: radius of curvature,

D: distance between surfaces on the optical axis,

Nd: refractive index for the Helium d-line (587.56 nm) of lens,

Vd: Abbe number, f: effective focal length of the projection lens system,

D3: distance between the fourth surface and the fifth surface on the optical axis, D9: distance between the tenth surface and the eleventh surface on the optical axis, D17: distance between the eighteenth surface and the nineteenth surface on the optical axis, and D19: distance between the twentieth surface and the twenty-first surface on the optical axis.

Example 1

The projection lens system 100 satisfies the parameters of Tables 1-3.

TABLE 1

| surface | type | R(mm) | D(mm) | Nd | Vd | Conic |
|---|---|---|---|---|---|---|
| S1 | spherical | 63.28 | 5.13 | 1.487 | 70.44 | — |
| S2 | spherical | 496.35 | 0.1 | — | — | — |
| S3 | spherical | 47.84 | 3.4 | 1.729 | 54.66 | — |
| S4 | spherical | 18.22 | 6.26 | — | — | — |
| S5 | spherical | 201.36 | 1.4 | 1.74 | 52.676 | — |
| S6 | spherical | 21.14 | 10.62 | — | — | — |
| S7 | spherical | 28.59 | 3.09 | 1.85 | 23.785 | — |
| S8 | spherical | 40.98 | 19.86(2.79) | — | — | — |
| S9 | spherical | 35.99 | 3.67 | 1.496 | 81.57 | — |
| S10 | spherical | −259.59 | 0.1 | — | — | — |
| S11 | spherical | 18.56 | 5.5 | 1.67 | 51.7585 | — |
| S12 | spherical | −536.96 | 0.3 | — | — | — |
| S13 | spherical | 365.99 | 4.8 | 1.728 | 28.32 | — |
| S14 | spherical | 28.1 | 1.39 | — | — | — |
| 50 | flat | infinity | 2.57 | — | — | — |
| S15 | spherical | −21.93 | 1.4 | 1.728 | 28.32 | — |
| S16 | spherical | 41.8 | 0.26 | — | — | — |
| S17 | aspherical | 24.140 | 4.06 | 1.68996 | 52.81 | 1.874858 |
| S18 | aspherical | −20.313 | 22.74 | — | — | −0.69899 |
| S19 | flat | infinity | 1.05 | 1.511 | 60.40 | — |
| S20 | flat | infinity | 1.11 | — | — | — |
| 40 | flat | infinity | — | — | — | — |

TABLE 2

| aspherical coefficient | S17 | S18 |
|---|---|---|
| A4 | −5.87979e−5 | 3.56641e−5 |
| A6 | 9.991033e−7 | 1.114679e−6 |
| A8 | −7.624939-9 | −1.627e−8 |
| A10 | 3.0030120e−10 | 4.699e−10 |

TABLE 3

| state | F | $F_{No}$ | F1 | F2 | F1/F2 | L | BFL | BFL/L |
|---|---|---|---|---|---|---|---|---|
| wide-angle state | 16 | 2.56 | −28.98 | 25.37 | −1.142 | 98.81 | 24.9 | 0.252 |
| tele-photo state | 25.6 | 3.24 | −28.98 | 25.37 | −1.142 | 90.38 | 24.9 | 0.276 |

Figure 2:
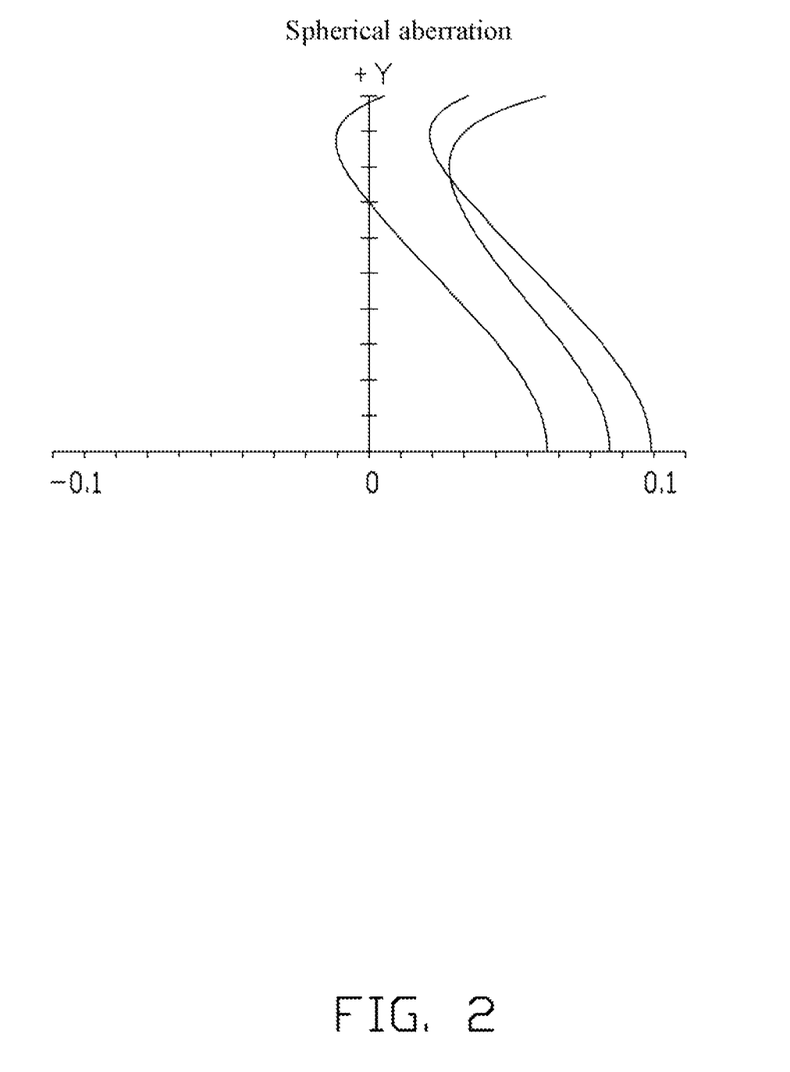
FIGS. 2-4 are graphs respectively showing spherical aberration, field curvature, and distortion of the projection lens system of FIG. 1, when the projection lens system is in a wide-angle state.
Figure 3:
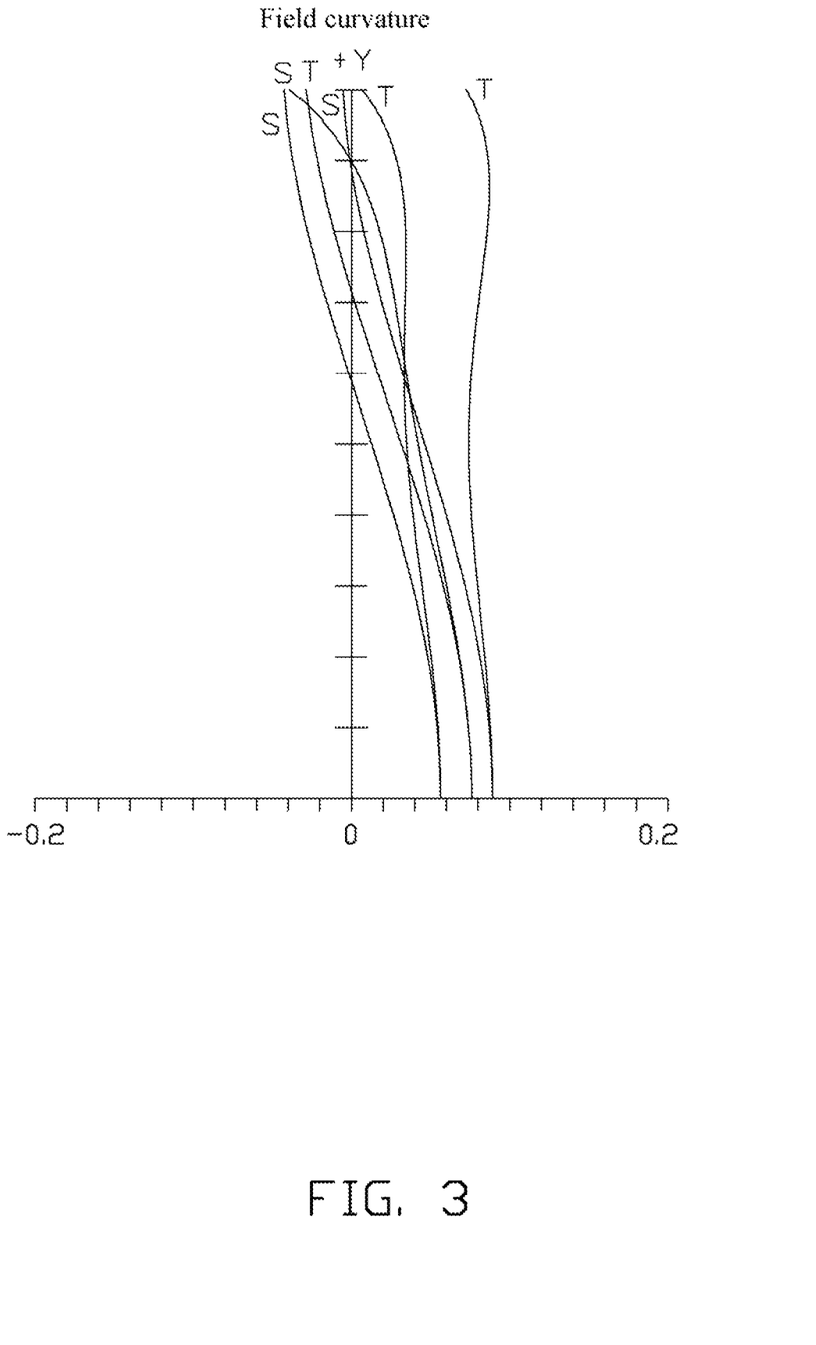
Figure 4:
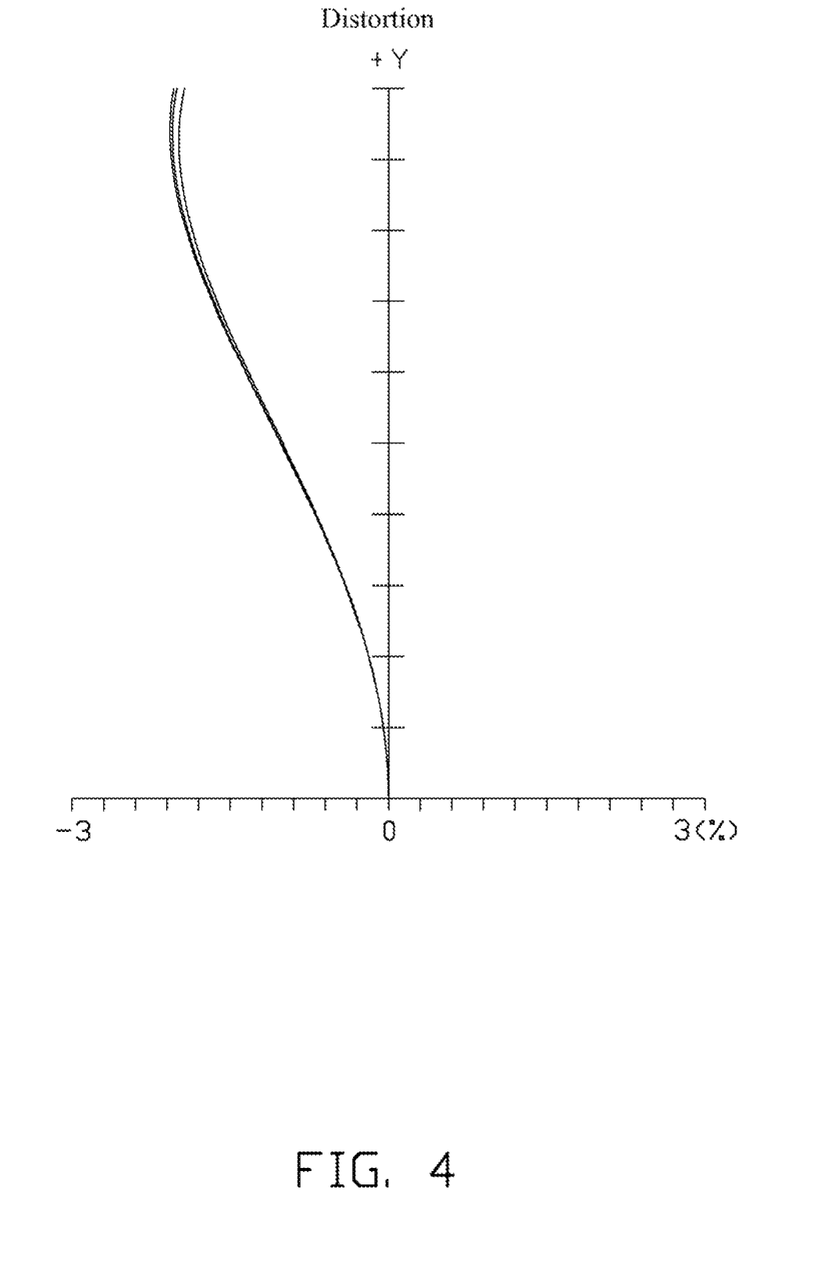

The spherical aberration graph, the field curvature graph, and the distortion graph of the projection lens system 100 in the wide angle state are respectively shown in FIGS. 2-4. The curves presented in the FIGS. 2-4 are F light rays (wavelength: 486 nm), d light rays (wavelength: 588 nm), c light rays (wavelength: 655 nm). The spherical aberration of visible light in FIG. 2 is within a range of −0.10 mm to 0.10 mm. The sagittal field curvature and tangential field curvature shown in FIG. 3 are kept within a range of −0.20 mm to 0.20 mm. The distortion in FIG. 4 falls within a range of −3% to 3%. Obviously, the spherical aberration, field curvature, and distortion are well controlled in the projection lens system 100.

Figure 5:
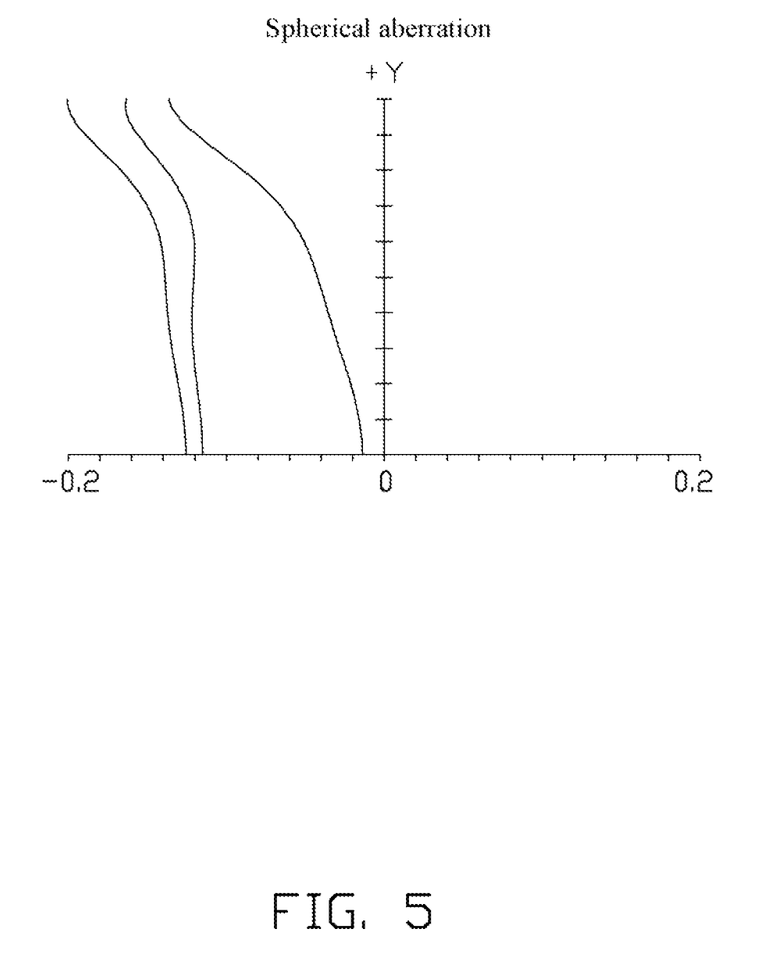
FIGS. 5-7 are graphs respectively showing spherical aberration, field curvature, and distortion of the projection lens system of FIG. 1, when the projection lens system is in a telephoto state.
Figure 6:
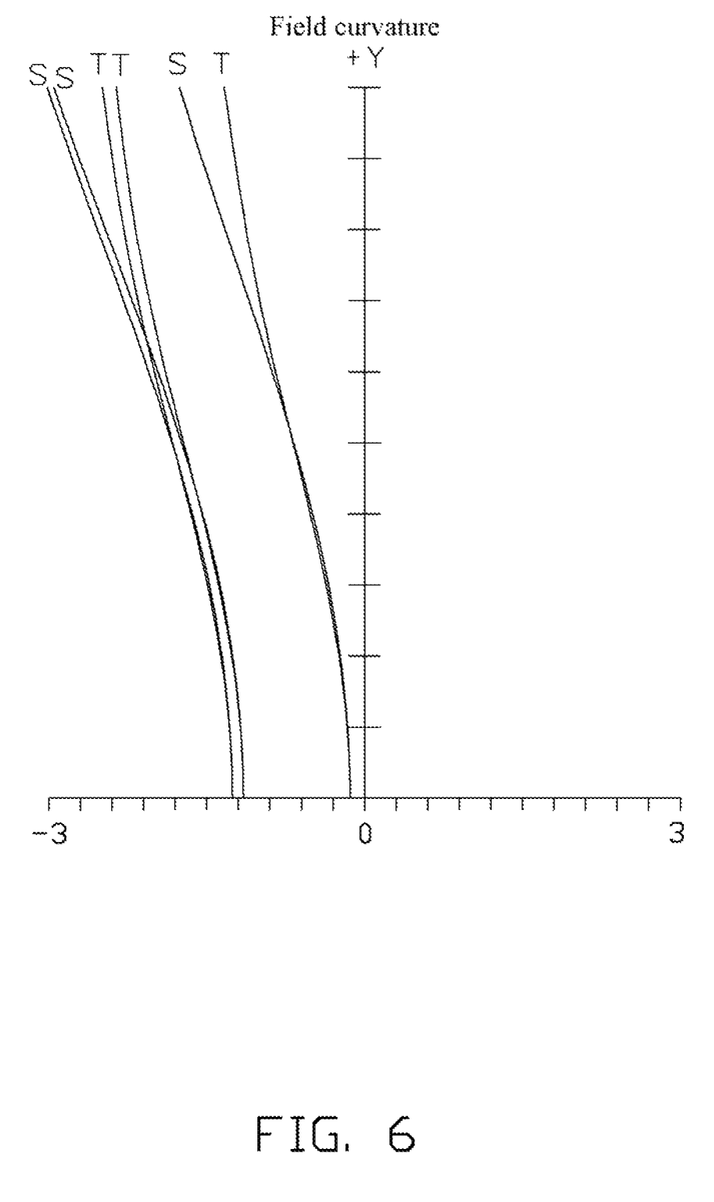
Figure 7:
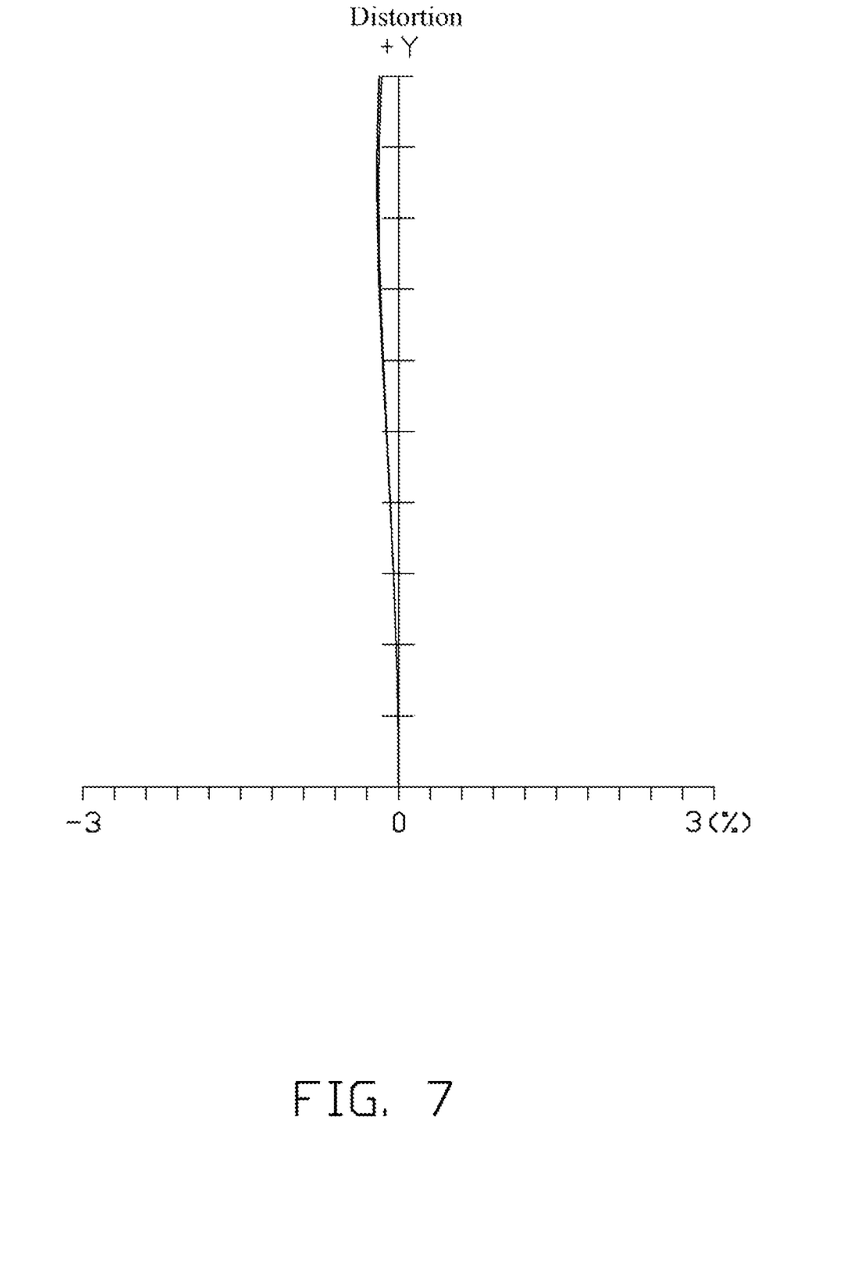
Figure 8:
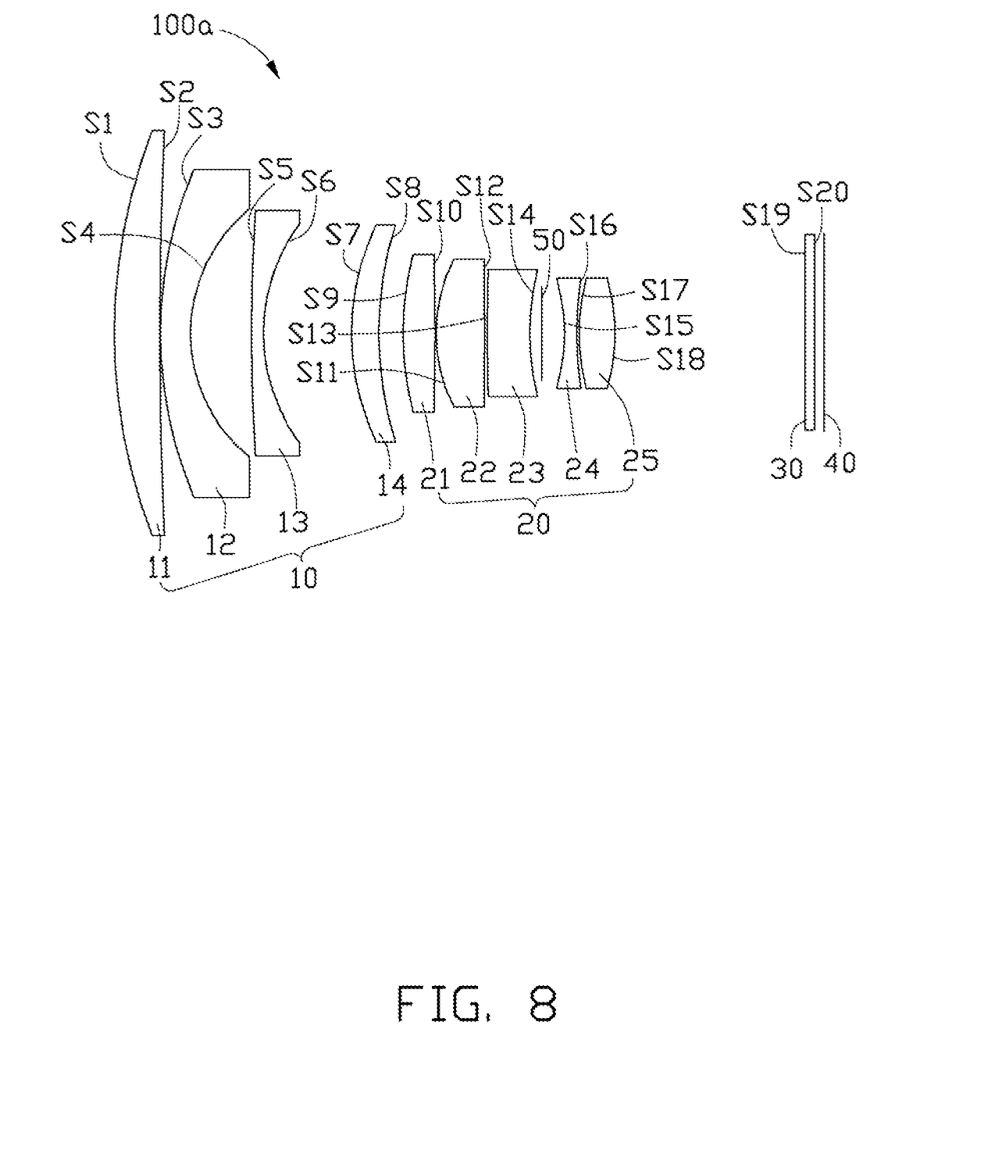
FIG. 8 is a schematic view of a projection lens system in accordance with a second exemplary embodiment.

The spherical aberration graph, the field curvature graph, and the distortion graph of the projection lens system 110 in the telephoto state are respectively shown in FIGS. 5-7. The curves presented in the FIGS. 5-7 are F light rays (wavelength: 486 nm), d light rays (wavelength: 588 nm), c light rays (wavelength: 655 nm). Spherical aberration of visible light in FIG. 5 is within a range of −0.20 mm to 0.20 mm. The sagittal field curvature and tangential field curvature shown in FIG. 6 are kept within a range of −0.30 mm to 0.30 mm. The distortion in FIG. 7 falls within a range of −3% to 3%. Obviously, the spherical aberration, field curvature, and distortion are well controlled in the projection lens system 100.

Example 2

Tables 4-6 show a specification of a second exemplary embodiment of the projection lens system 100a.

TABLE 4

| surface | type | R(mm) | D(mm) | Nd | Vd | Conic |
|---|---|---|---|---|---|---|
| S1 | spherical | 63.28 | 5.13 | 1.487 | 70.44 | — |
| S2 | spherical | 496.35 | 0.1 | — | — | — |
| S3 | spherical | 47.84 | 3.4 | 1.729 | 54.66 | — |
| S4 | spherical | 18.22 | 6.26 | — | — | — |
| S5 | spherical | 201.36 | 1.4 | 1.74 | 52.676 | — |
| S6 | spherical | 21.14 | 10.62 | — | — | — |
| S7 | spherical | 28.59 | 3.09 | 1.85 | 23.785 | — |
| S8 | spherical | 40.98 | 19.86(2.80) | — | — | — |
| S9 | spherical | 35.99 | 3.67 | 1.496 | 81.57 | — |
| S10 | spherical | −259.59 | 0.1 | — | — | — |
| S11 | spherical | 18.56 | 5.5 | 1.67 | 51.7585 | — |
| S12 | spherical | −536.96 | 0.3 | — | — | — |
| S13 | spherical | 365.99 | 4.8 | 1.728 | 28.32 | — |
| S14 | spherical | 28.1 | 1.39 | — | — | — |
| 50 | flat | infinity | 2.57 | — | — | — |

TABLE 4-continued

| surface | type | R(mm) | D(mm) | Nd | Vd | Conic |
|---|---|---|---|---|---|---|
| S15 | spherical | −21.93 | 1.4 | 1.728 | 28.32 | — |
| S16 | spherical | 41.8 | 0.26 | — | — | — |
| S17 | aspherical | 24.140 | 4.06 | 1.69036 | 52.86 | 1.874858 |
| S18 | aspherical | −20.313 | 22.74 | — | — | −0.69899 |
| S19 | flat | infinity | 1.05 | 1.511 | 60.40 | — |
| S20 | flat | infinity | 1.11 | — | — | — |
| 40 | flat | infinity | — | — | — | — |

TABLE 5

| aspherical coefficient | S17 | S18 |
|---|---|---|
| A4 | −5.87979e−5 | 3.56641e−5 |
| A6 | 9.991033e−7 | 1.114679e−6 |
| A8 | −7.624939-9 | −1.627e−8 |
| A10 | 3.0030120e−10 | 4.699e−10 |

TABLE 6

| State | F | $F_{No}$ | F1 | F2 | F1/F2 | L | BFL | BFL/L |
|---|---|---|---|---|---|---|---|---|
| wide-angle state | 16 | 2.55 | −28.98 | 25.36 | −1.143 | 98.73 | 24.9 | 0.252 |
| telephoto state | 25.62 | 3.24 | −28.98 | 25.36 | −1.143 | 90.32 | 24.9 | 0.276 |

Figure 9:
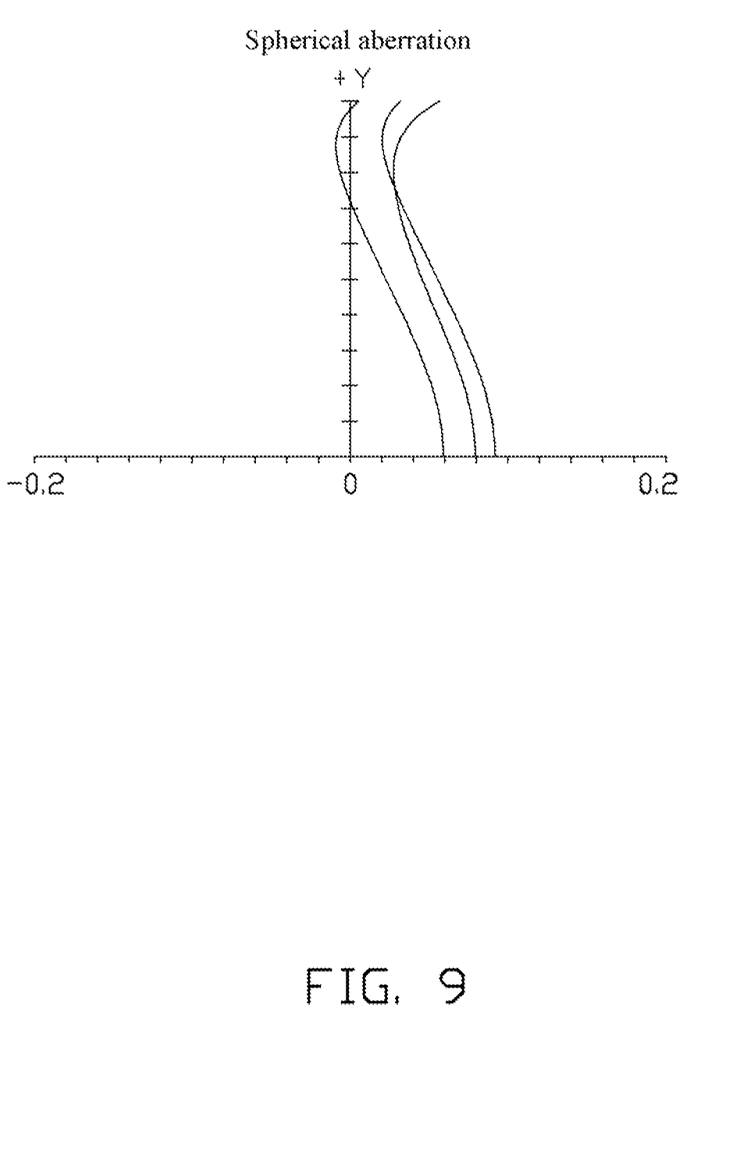
FIGS. 9-11 are graphs respectively showing spherical aberration, field curvature, and distortion of the projection lens system of FIG. 8, when the projection lens system is in a wide-angle state.
Figure 10:
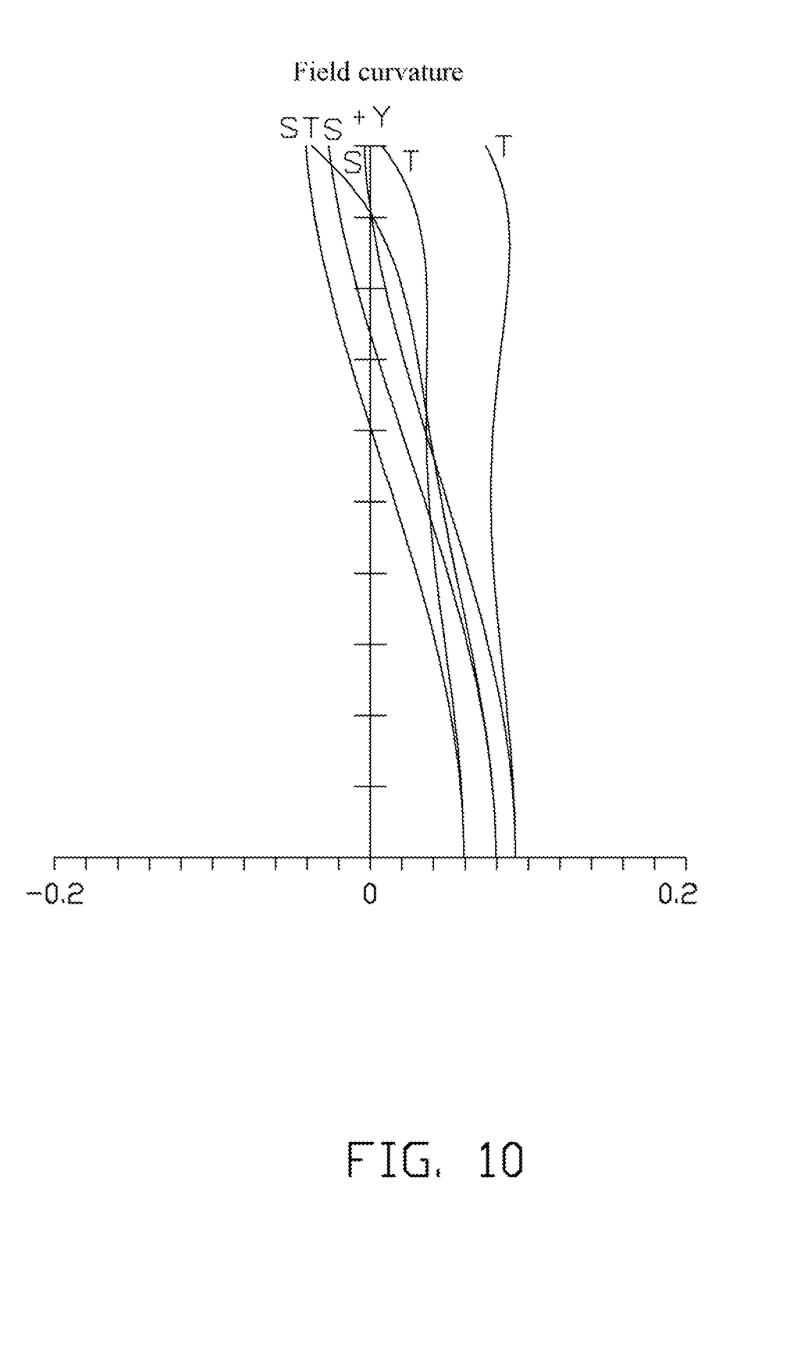
Figure 11:
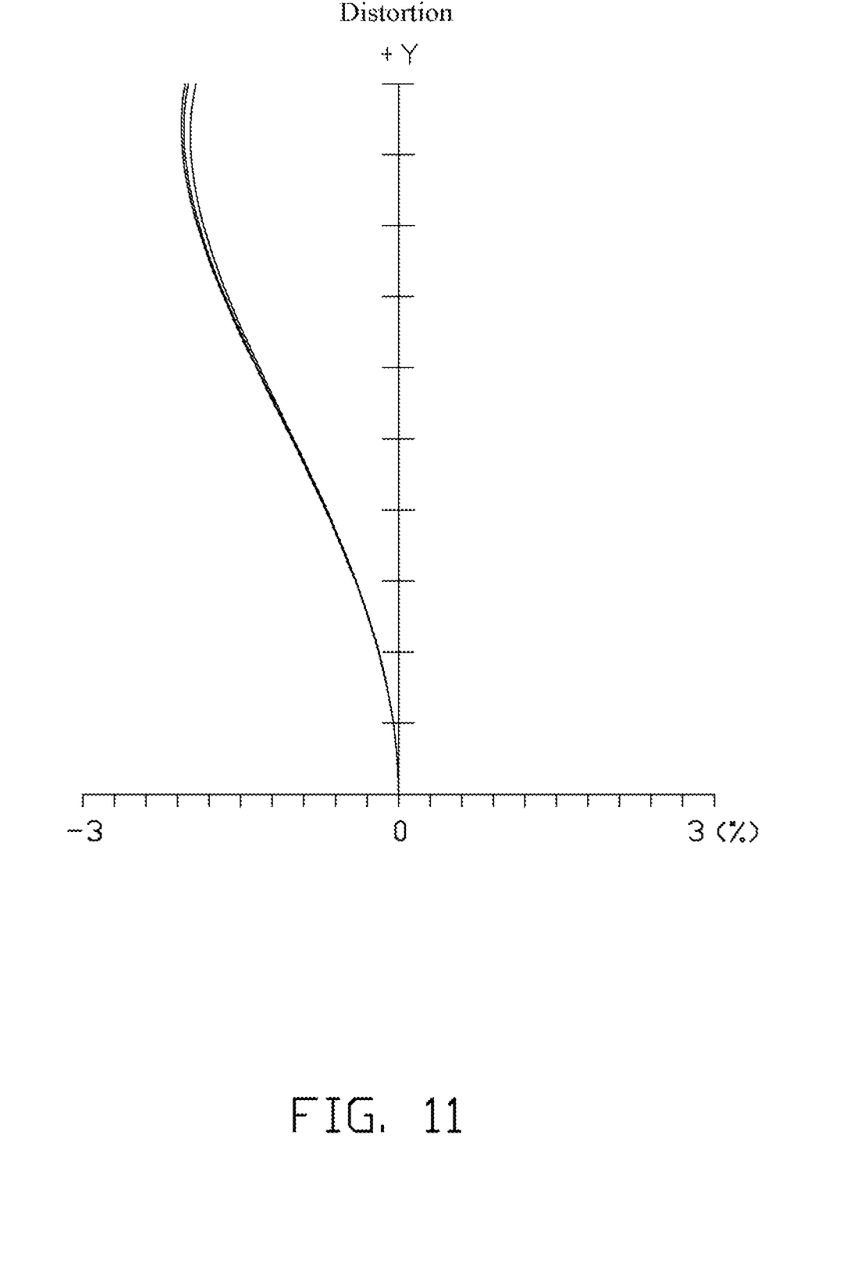

The spherical aberration graph, the field curvature graph, and the distortion graph of the projection lens system 100*a* in the wide angle state are respectively shown in FIGS. 9-11. The curves presented in the FIGS. 9-11 are F light rays (wavelength: 486 nm), d light rays (wavelength: 588 nm), c light rays (wavelength: 655 nm). Spherical aberration of visible light in FIG. 9 is within a range of −0.20 mm to 0.20 mm. The sagittal field curvature and tangential field curvature shown in FIG. 10 are kept within a range of −0.20 mm to 0.20 mm. The distortion in FIG. 11 falls within a range of −3% to 3%. Obviously, the spherical aberration, field curvature, and distortion are well controlled in the projection lens system 110*a*.

Figure 12:
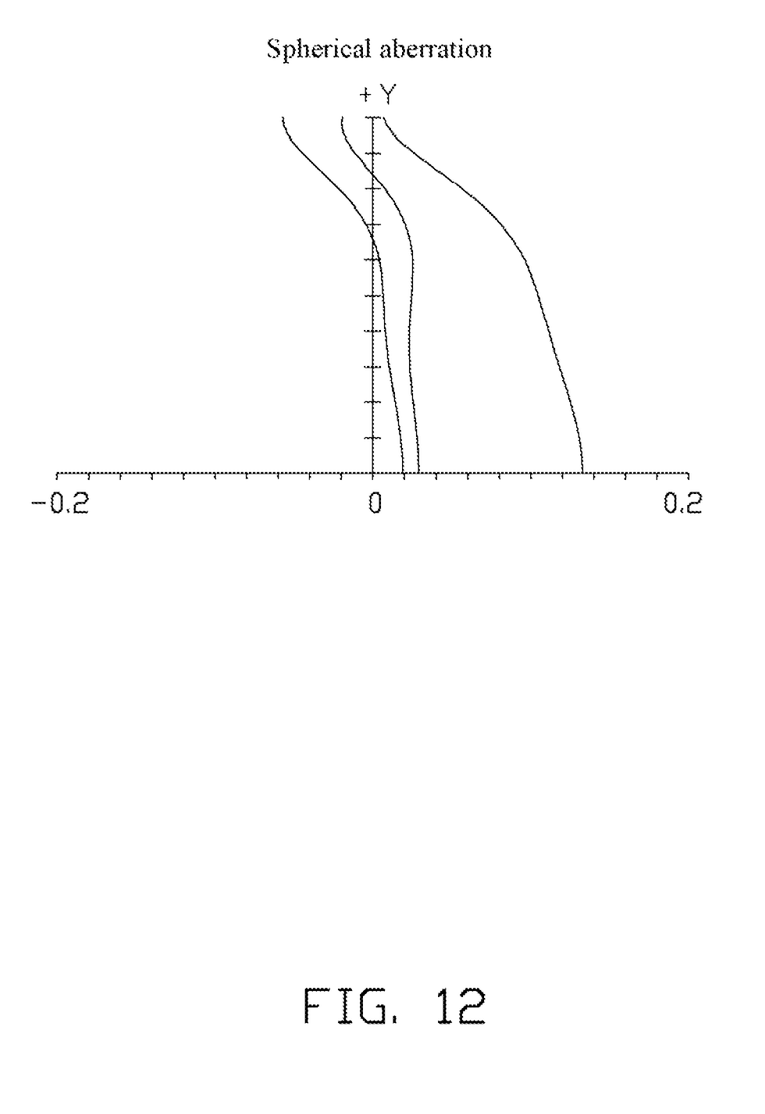
FIGS. 12-14 are graphs respectively showing spherical aberration, field curvature, and distortion of the projection lens system of FIG. 8, when the projection lens system is in a telephoto state.
Figure 13:
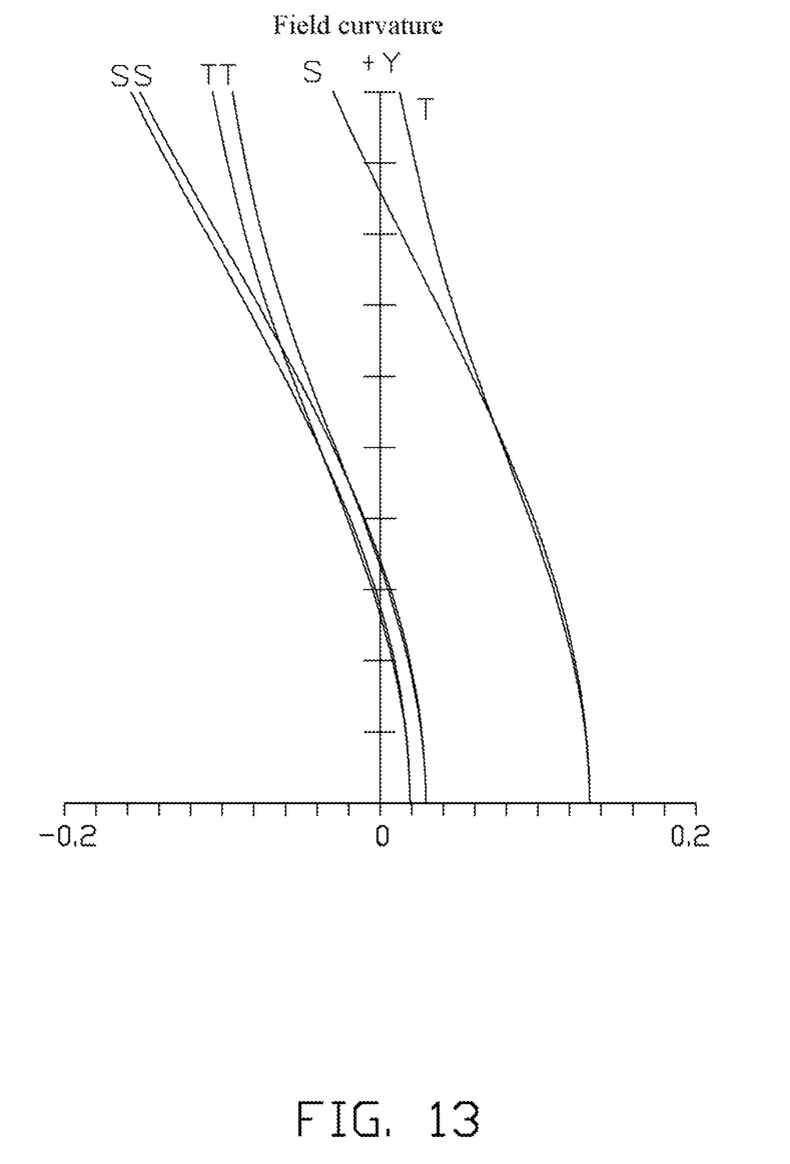
Figure 14:
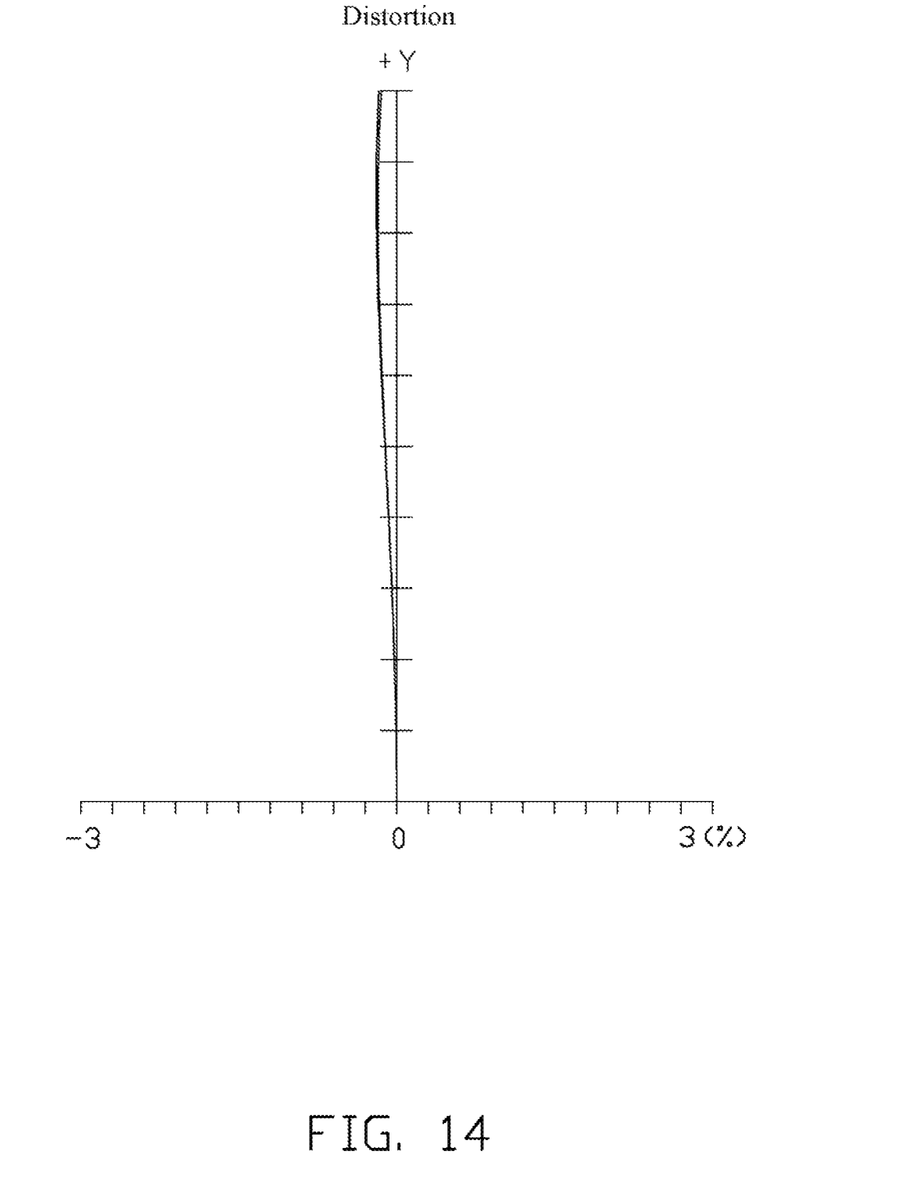

The spherical aberration graph, the field curvature graph, and the distortion graph of the projection lens system 110*a* in the telephoto state are respectively shown in FIGS. 12-14. The curves presented in the FIGS. 5-7 are F light rays (wavelength: 486 nm), d light rays (wavelength: 588 nm), c light rays (wavelength: 655 nm). Spherical aberration of visible light in FIG. 12 is within a range of −0.20 mm to 0.20 mm. The sagittal field curvature and tangential field curvature shown in FIG. 13 are kept within a range of −0.20 mm to 0.20 mm. The distortion in FIG. 14 falls within a range of −3% to 3%. Obviously, the spherical aberration, field curvature, and distortion are well controlled in the projection lens system 110*a*.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A projection lens system projecting light rays modulated by a spatial light modulator (SLM), the projection lens system, in the order from a magnified side to a reduced side, comprising:
    a first lens group with negative refraction power;
    a second lens group with positive refraction power, wherein the projection lens system satisfies the formulas:

$$-1.55 < F1/F2 < -1.12; \text{ and}$$

$$0.2 < BFL/L < 0.28,$$

wherein F1 is the effective focal length of the first lens group, F2 is the effective focal length of the second lens group, BFL is a distance from the second lens group to the SLM, and L is a total length of the projection lens system.

2. The projection lens system as claimed in claim 1, wherein the first lens group comprises, in the order from a magnified side to a reduced side of the projection lens system, a first lens with positive refraction power, a second lens with negative refraction power, a third lens with negative refraction power, and a fourth lens with positive refraction power.

3. The projection lens system as claimed in claim 2, wherein the first lens, the second lens, the third lens, and the fourth lens are spherical lenses.

4. The projection lens system as claimed in claim 2, wherein the second lens group comprises, in the order from a magnified side to a reduced side of the projection lens system, a fifth lens with positive refraction power, a sixth lens with positive retraction power, a seventh lens with negative refraction power, an eighth lens with negative refraction power, and a ninth lens with positive refraction power.

5. The projection lens system as claimed in claim 4, wherein the fifth lens, the sixth lens, the seventh lens, and the eighth lens are spherical lenses, the ninth lens is aspherical lens.

6. The projection lens system as claimed in claim 5, wherein the ninth lens is a moulded lens.

7. The projection lens system as claimed in claim 6, wherein the projection lens system consists of at most ten lenses.

8. The projection lens system as claimed in claim 7, further comprising an aperture stop positioned between the seventh lens and the eighth lens.

* * * * *